United States Patent
McWilliams et al.

(10) Patent No.: US 11,177,954 B2
(45) Date of Patent: Nov. 16, 2021

(54) FIRMWARE-INACCESSIBLE KEY STORAGE

(71) Applicant: Hewlett-Packard Development Company, L.P., Houston, TX (US)

(72) Inventors: John L McWilliams, San Diego, CA (US); Jefferson P Ward, Vancouver, WA (US); Stephen D Panshin, Corvallis, OR (US); Francisco Alcazar, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 319 days.

(21) Appl. No.: 16/083,048

(22) PCT Filed: Jun. 20, 2016

(86) PCT No.: PCT/US2016/038339
§ 371 (c)(1),
(2) Date: Sep. 7, 2018

(87) PCT Pub. No.: WO2017/222499
PCT Pub. Date: Dec. 28, 2017

(65) Prior Publication Data
US 2019/0089534 A1 Mar. 21, 2019

(51) Int. Cl.
*G06F 21/60* (2013.01)
*H04L 9/08* (2006.01)
(Continued)

(52) U.S. Cl.
CPC .......... *H04L 9/0897* (2013.01); *G06F 21/602* (2013.01); *G06F 21/606* (2013.01);
(Continued)

(58) Field of Classification Search
CPC ........ G06F 21/606; G06F 21/85; G06F 21/72; G06F 21/602; G06F 21/78; H04L 9/0897;
(Continued)

(56) References Cited

U.S. PATENT DOCUMENTS

| 5,204,902 A | 4/1993 | Reeds, III |
| 5,937,063 A * | 8/1999 | Davis .................. G06F 12/1408 |
| | | 711/E12.092 |

(Continued)

FOREIGN PATENT DOCUMENTS

| KR | 10-2008-0041420 A | 5/2008 |
| WO | WO-01/05085 | 1/2001 |

OTHER PUBLICATIONS

Menezes A J Et al: Handbook of Applied Cryptography, key establishment protocols. Jan. 1, 1997 Handbook of Applied Cryptography; CRC Press Series US—pp. 489-508.

(Continued)

*Primary Examiner* — Vu V Tran
(74) *Attorney, Agent, or Firm* — HP Inc. Patent Department (57) ABSTRACT

An example system includes a secure processing engine. The secure processing engine is to store a host key. The system also includes an integrated circuit in a single package. The integrated circuit includes a firmware engine to execute firmware instructions. The integrated circuit also includes a one-time-programmable (OTP) memory unreadable by the firmware engine. The OTP memory is to store the host key. The integrated circuit also includes a security engine. The security engine is to encrypt and decrypt communications between the firmware engine and the secure processing engine based on the host key.

12 Claims, 6 Drawing Sheets

(51) Int. Cl.
- *H04L 29/06* (2006.01)
- *G06F 21/85* (2013.01)
- *G06F 21/72* (2013.01)
- *G06F 21/78* (2013.01)

(52) U.S. Cl.
CPC .............. *G06F 21/72* (2013.01); *G06F 21/78* (2013.01); *G06F 21/85* (2013.01); *H04L 9/0869* (2013.01); *H04L 63/0428* (2013.01); *H04L 2209/12* (2013.01)

(58) Field of Classification Search
CPC .................... H04L 9/0869; H04L 63/0428; H04L 2209/12
See application file for complete search history.

(56) References Cited

U.S. PATENT DOCUMENTS

| | | | |
|---|---|---|---|
| 8,850,543 B2 | 9/2014 | Von Bokern et al. | |
| 8,966,279 B2 | 2/2015 | Farrugia et al. | |
| 9,094,190 B2 | 7/2015 | Park et al. | |
| 2005/0182948 A1* | 8/2005 | Ducharme | G06F 21/10 713/189 |
| 2006/0131743 A1* | 6/2006 | Erickson | G06F 21/71 257/737 |
| 2006/0195704 A1* | 8/2006 | Cochran | H04L 9/0894 713/193 |
| 2009/0164800 A1* | 6/2009 | Johansson | G06F 21/74 713/189 |
| 2009/0172401 A1* | 7/2009 | Cizas | G06F 21/85 713/169 |
| 2009/0327762 A1* | 12/2009 | Boudreaux | G06F 21/32 713/194 |
| 2010/0254537 A1* | 10/2010 | Buer | H04L 9/083 380/279 |
| 2013/0142324 A1 | 6/2013 | Nagai et al. | |
| 2014/0250302 A1 | 9/2014 | Nagai et al. | |
| 2015/0074394 A1 | 3/2015 | Nagai et al. | |
| 2015/0195258 A1* | 7/2015 | Kohiyama | G06F 21/10 713/168 |
| 2016/0125187 A1* | 5/2016 | Oxford | H04L 63/0442 713/2 |
| 2016/0154967 A1* | 6/2016 | Lee | G06F 21/6245 713/189 |

OTHER PUBLICATIONS

European Editors, "Securing Pervasive Connectivity", Publitek European Editors, http://www.digikey.com/en/articles/techzone/, Apr. 8, 2015, 5 pages.

Skorobogatove, Sergie, P., "Copy Protection in Modern Microcontrollers", https://www.cl.cam.ac.uk/~sps32/mcu_lock.html, Nov. 14, 2001, 12 pages.

* cited by examiner

FIRMWARE-INACCESSIBLE KEY STORAGE

BACKGROUND

A printer may form an image on a medium. For example, the printer may deliver a colored substance to the medium to print the image on the medium. The printer may need to determine where to deliver the colored substance to form the desired image. The printer may include a firmware engine to execute firmware instructions. The firmware engine may determine formatting information for producing the desired image.

DETAILED DESCRIPTION

In an example, the printer may include a secure microcontroller communicatively coupled to the firmware engine. The firmware engine may communicate formatting data to and receive formatting data from the secure microcontroller. The secure microcontroller may in turn communicate the formatting data to and receive the formatting data from ink supplies in the printer. The firmware engine and the secure microcontroller may encrypt the communications between the firmware engine and the secure microcontroller to prevent eavesdropping on the communications.

In an example, the firmware engine may encrypt and decrypt communications with the secure microcontroller. However, the firmware engine may be susceptible to attacks that reveal the key used by the firmware engine to encrypt and decrypt communications. For example, malicious code may be included in the instructions executed by the firmware engine, or the firmware engine may be placed in a test mode in which a register containing communicated data can be read out. Accordingly, security of the printer could be improved by preventing exploitation of the firmware engine to read keys. Similarly, other systems, such as computers, smartphones, tablet, routers, etc., may include components that need to communicate information securely between one another without allowing access to that information by a firmware engine.

Figure 1:
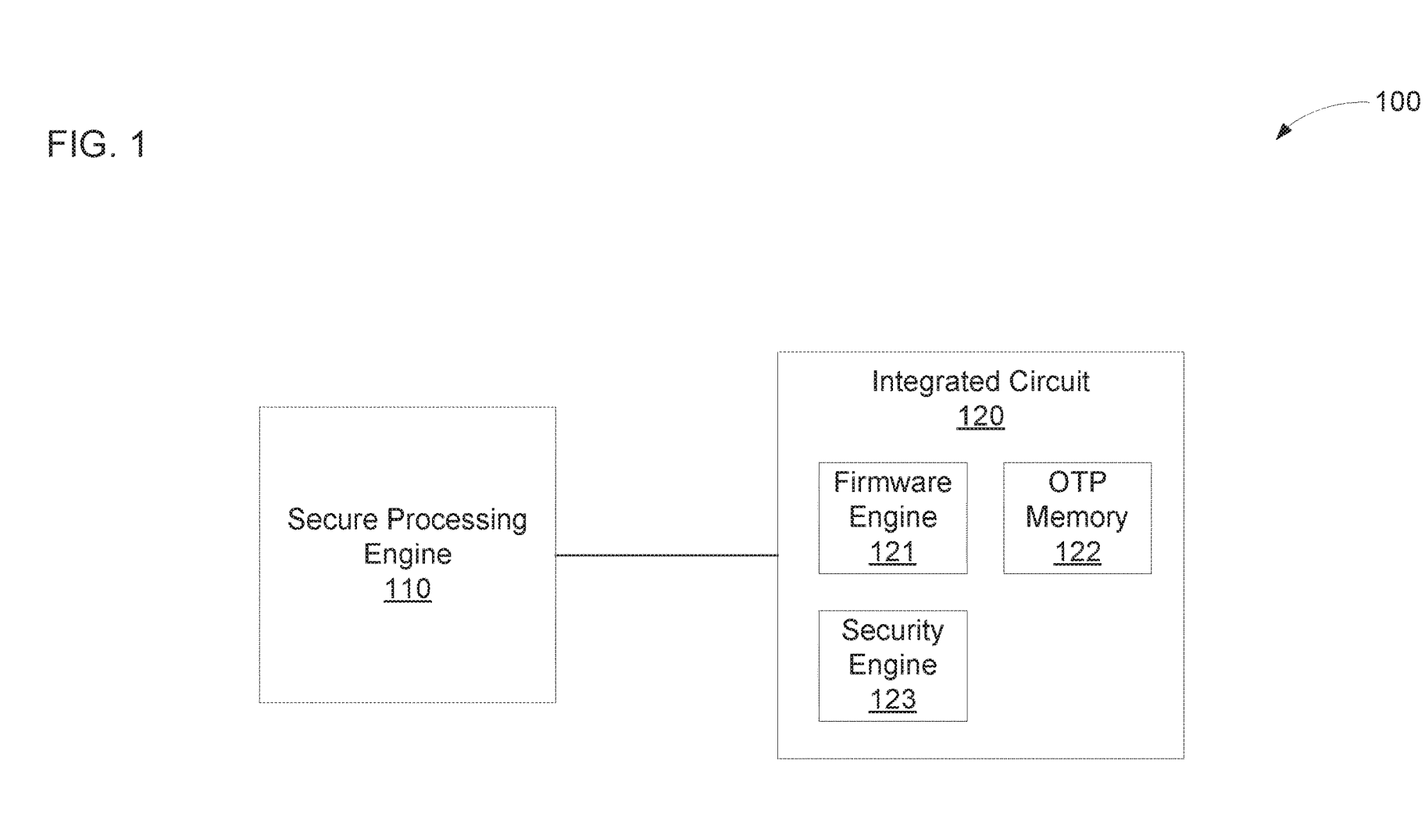
FIG. 1 is a block diagram of an example system to communicate information between components securely.

FIG. 1 is a block diagram of an example system 100 to communicate information between components securely. The system 100 may include a secure processing engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. Hardware may also include memory storage elements, such as read-only memory (ROM) (e.g., programmable ROM, electrically erasable programmable ROM, etc.), random-access memory (RAM) (e.g., static RAM, dynamic RAM, etc.), a one-time-programmable (OTP) memory or the like. A combination of hardware and software includes software hosted at hardware (e.g., a software module that is stored at a processor-readable memory such as ROM, RAM, a hard-disk or solid-state drive, resistive memory, or optical media such as a digital versatile disc (DVD), and/or executed or interpreted by a processor), or hardware and software hosted at hardware.

The secure processing engine 110 may include a secure microcontroller in some examples. The secure processing engine 110 may store a host key. The secure processing engine 110 may encrypt or decrypt communications using the host key. The host key may be a symmetric key, an asymmetric key, or the like. The secure processing engine 110 may store the host key locally in the secure processing engine 110. It may be difficult or impossible for an attacker to recover the host key from the secure processing engine 110.

The system 100 may also include an integrated circuit 120. The integrated circuit 120 may be included in a single package. As used herein, the term "single package" refers to a package in which communicative couplings between engines are inaccessible to a user. For example, the integrated circuit 120 may include an ASIC on a single chip, a system-on-a-chip (SoC) on a single chip, or the like. The integrated circuit 120 may include a firmware engine 121. The firmware engine 121 may execute firmware instructions.

The integrated circuit 120 may also include an OTP memory 122. The OTP memory 122 may be unreadable by the firmware engine 121. The OTP memory 122 may store a host key. As used herein, the term "store" refers to maintaining information in storage device. Storing may, but does not necessarily include adding the information to the storage device. Since the OTP memory is unreadable by the firmware engine 121, the firmware engine 121 may not be able to read the host key.

The integrated circuit 120 may include a security engine 123. The security engine 123 may encrypt and decrypt communications between the firmware engine 121 and the secure processing engine 110. For example, the security engine 123 may encrypt communications transmitted from the firmware engine 121 to the secure processing engine 110 and may decrypt communications transmitted from the secure processing engine 110 to the firmware engine 121. The security engine 123 may encrypt and decrypt the communications based on the host key.

Figure 2:
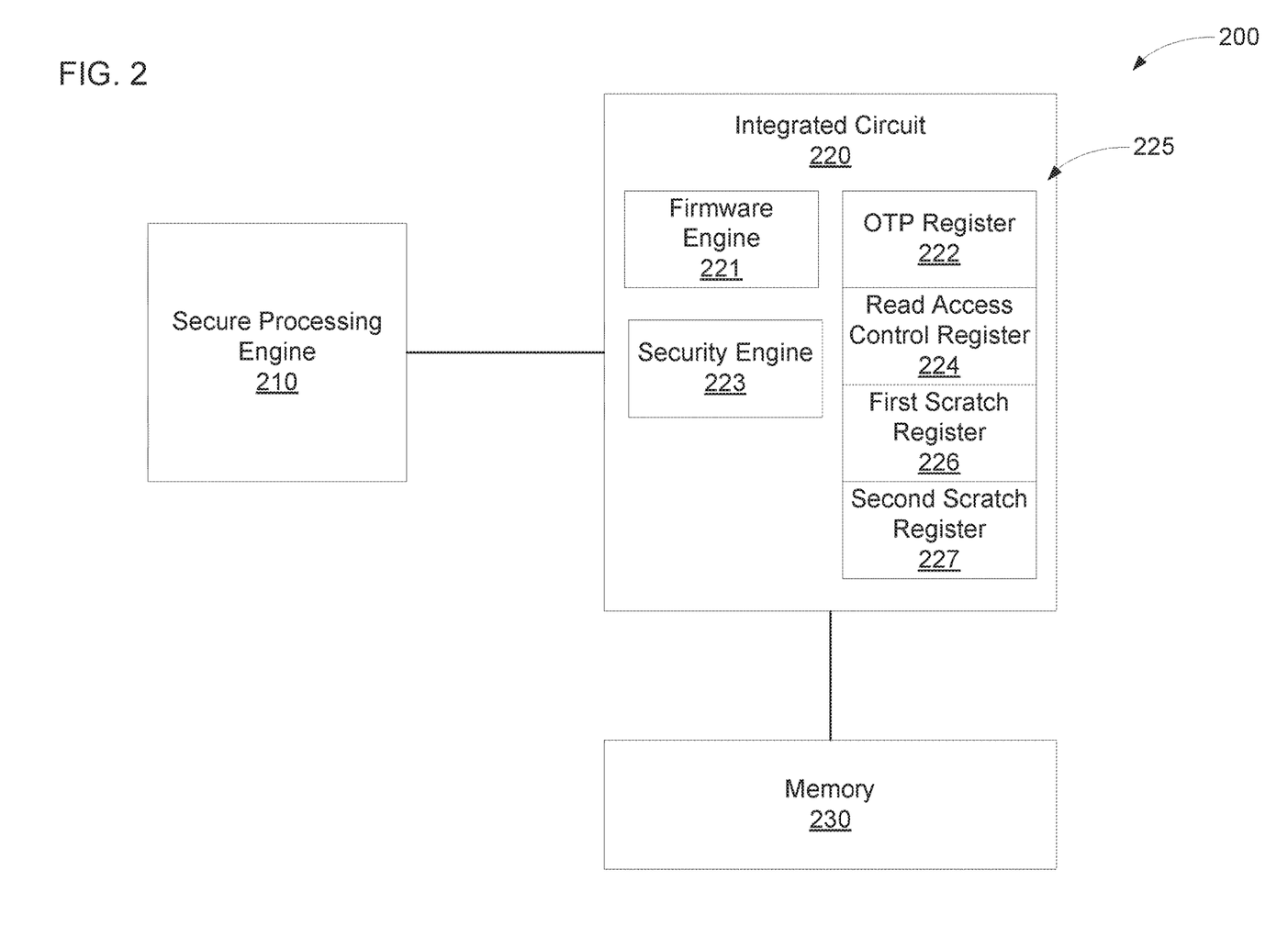
FIG. 2 is a block diagram of another example system to communicate information between components securely.

FIG. 2 is a block diagram of another example system 200 to communicate information between components securely. The system 200 may include a printer, computer, smartphone, tablet, router, or the like. The system 200 may include a secure processing engine 210. The secure processing engine 210 may store a host key. For example, the host key may be programmed into the secure processing engine 210 during manufacture of the system 200. The secure processing engine 210 may store the host key in a manner that prevents access to the host key by a user of the system 200.

The system 200 may also include an integrated circuit 220. The integrated circuit 220 may be communicatively coupled to the secure processing engine 210. The integrated circuit 220 may be included in a single package. The integrated circuit 220 may include a firmware engine 221. The firmware engine 221 may execute firmware instructions. For example, the system 200 may include a memory 230 that stores firmware instructions. The firmware engine 221 may retrieve firmware instructions from the memory 230 and execute them.

The integrated circuit 220 may include a plurality of registers 225. In an example, the firmware engine 221 may read or write data to the registers 225 as part of executing instructions. The registers 225 may include a plurality of OTP registers 222. The OTP registers 222 may store a host key. For example, the host key may be programmed into the OTP registers 222 during manufacture of the integrated circuit 220, during manufacture of the system 200, before a first use of the system 200, or the like. Once programmed, the OTP registers 222 may not be reprogrammed.

The registers 225 may include a read access control register 224. The read access control register 224 may control whether the OTP registers 222 are accessible to the firmware engine 221. For example, each of the other OTP registers 222 may correspond to a control bit in the read access control register 224. The programming of the control bit in the read access control register 224 may determine whether the corresponding OTP register 222 is accessible to firmware. The read access control register 224 may be programmed when the OTP registers 222 are programmed, and may also be programmable once. Accordingly, programming the read access control register 224 may determine permanently or substantially permanently whether the OTP registers 222 are accessible to the firmware engine 221. In some examples, the read access control register 224 may be programmed to prohibit access by the firmware engine 221 to an OTP register 222 that is storing or going to store the host key.

The integrated circuit 220 may include a security engine 223 to encrypt and decrypt communications between the firmware engine 221 and the secure processing engine 210. For example, the firmware engine 221 may save a message to be encrypted to a first scratch register 226 accessible to the security engine 223. The security engine 223 may encrypt the message, and the firmware engine 221 or the security engine 223 may transmit the encrypted message to the secure processing engine 210. If the firmware engine is going to transmit the encrypted message, the security engine 223 may save the encrypted message in a first scratch register 226 readable by the firmware engine 221. When an encrypted message is received from the secure processing engine 210, the security engine 223 may decrypt the encrypted message. The security engine 223 may store the decrypted message in a first scratch register 226 accessible to the firmware engine 221.

The security engine 223 may encrypt and decrypt the messages based on a host key. The host key may be stored in an OTP register 222 that is inaccessible to the firmware engine 221 but is accessible to the security engine 223. The security engine 223 may encrypt and decrypt messages directly from the host key or may do so indirectly. For example, the security engine 223 and the secure processing engine 210 may generate a session key based on the host key stored by each. The session key may be stored in a second scratch register 227 that is inaccessible to the firmware engine 221. The read access control register 224 may control whether the scratch registers are accessible to the firmware engine 221. For example, the read access control register 224 may have a bit set to allow access to the first scratch register 226 by the firmware engine 221, and the read access control register 224 may have another bit set to prevent access to the second scratch register 227.

To generate a session key, the security engine 223 and the secure processing engine 210 may exchange a random or pseudorandom number. Only the security engine 223, only the secure processing engine 210, or either the security engine 223 or the secure processing engine 210 may generate the random or pseudorandom number and transmit it to the other of the security engine 223 or the secure processing engine 210. The security engine 223 and the secure processing engine 210 may each combine the random or pseudorandom number with the host key to produce the session key. For example, the random or pseudorandom number and host key may be concatenated, xored, hashed together (e.g., with additional information, such as a session identifier, etc.), or the like to generate the session key. The security engine 223 and the secure processing engine 210 may encrypt and decrypt messages based on the session key. For example, the security engine 223 and the secure processing engine 210 may use the session key as the key that is input into an encryption algorithm, such as Advanced Encryption Standard, Twofish, etc. In an example, all communications between the firmware engine 221 and the secure processing engine 210 may be encrypted/decrypted by the security engine 223. However, the firmware engine 221 may not know the host key or the session key and may not be able to read the host key or the session key from the OTP register 222 nor from the second scratch register 227.

In some examples, the integrated circuit 220 may be placed in a test mode, and the contents of the registers may be output by the integrated circuit. Accordingly, an attacker could learn the values of the host or session keys by placing the integrated circuit in test mode and outputting the contents of the OTP registers 222 or the scratch register 227. Thus, in an example, the contents of the OTP registers 222 and the scratch register 227 may be externally unreadable when the integrated circuit is placed in the test mode. However, making the OTP and scratch registers 222, 227 unreadable in the test mode may prevent or increase the difficulty of testing the security engine 223 and the OTP and scratch registers 222, 227. In an example, the integrated circuit 220 may have a first mode in which the contents of the OTP and scratch registers 222, 227 are read out when in test mode. The integrated circuit 220 may receive an input permanently transitioning the integrated circuit 220 to a second mode. For example, the integrated circuit 220 may be transitioned from the first mode to the second mode by setting an OTP bit. In the second mode, the contents of the OTP and scratch registers 222, 227 are not read out when the integrated circuit is in the test mode.

Figure 3:
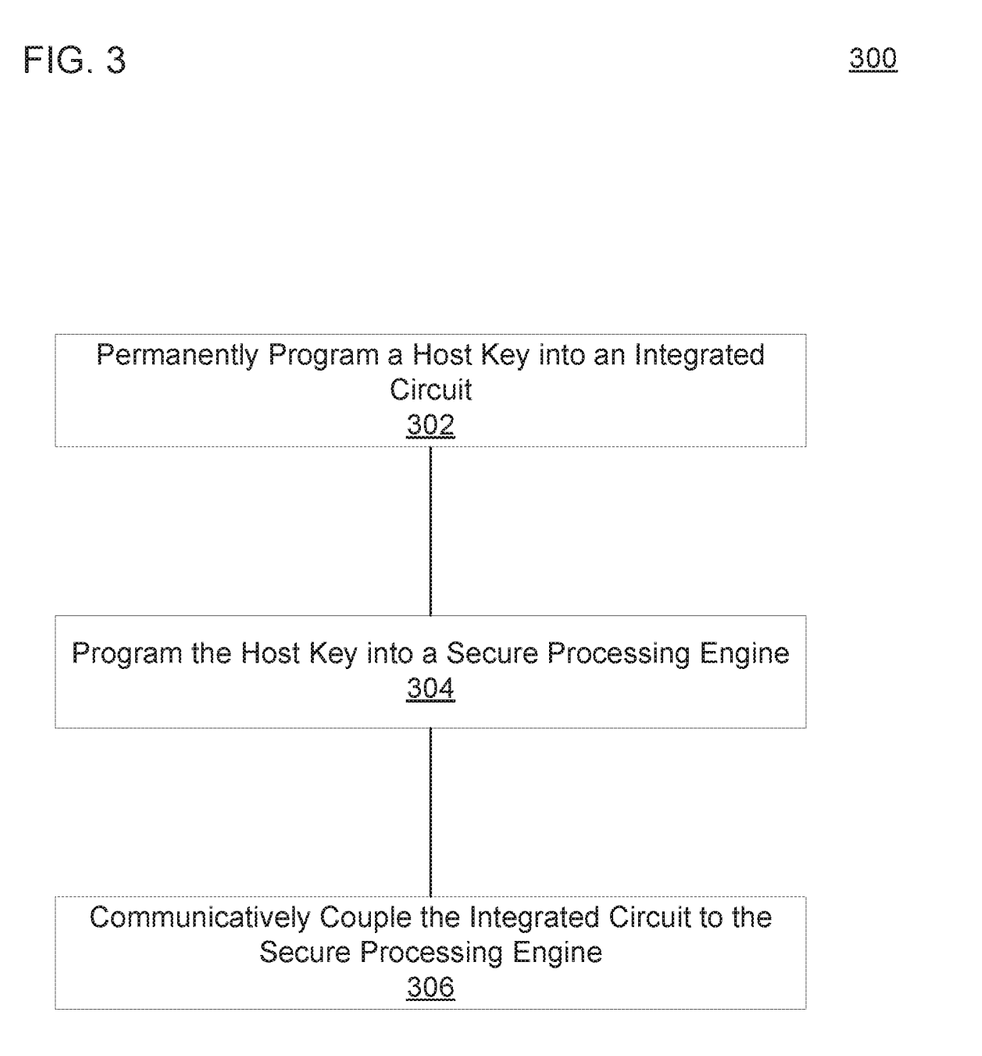
FIG. 3 is a flow diagram of an example method to produce a system able to communicate information between components securely.

FIG. 3 is a flow diagram of an example method 300 to produce a system able to communicate information between components securely. A processor may perform the method 300. At block 302, the method 300 may include permanently programming a host key into an integrated circuit in a single package. Permanently programming the host key may include storing the host key in the integrated circuit such that the host key cannot be overwritten or changed. The host key may be inaccessible to a firmware engine in the integrated circuit when it is stored in the integrated circuit. For example, the firmware engine may not be able to read the host key from the location in which it is stored.

At block 304, the method 300 may include programming the host key into a secure processing engine. The host key programmed into the secure processing engine may be the exact same host key programmed into the integrated circuit. Programming the host key into the secure processing engine may include causing the secure processing engine to store the host key. The host key may be programmed into a storage location in the secure processing engine from which the host key cannot be read by a user.

At block 306, the method 300 may include communicatively coupling the integrated circuit to the secure processing engine. For example, a communication pin of the integrated circuit may be wired to a communication pin of the secure processing engine. The integrated circuit and the secure processing engine may be wired together by attaching the integrated circuit and the secure processing engine to a printed circuit board containing conductors that connect the integrated circuit to the secure processing engine once they are attached. In an example, a manufacturer may perform block 302 on the integrated circuit 120 of FIG. 1, block 304 on the secure processing engine 110, and block 306 on the integrated circuit 120 and the secure processing engine 110.

Figure 4:
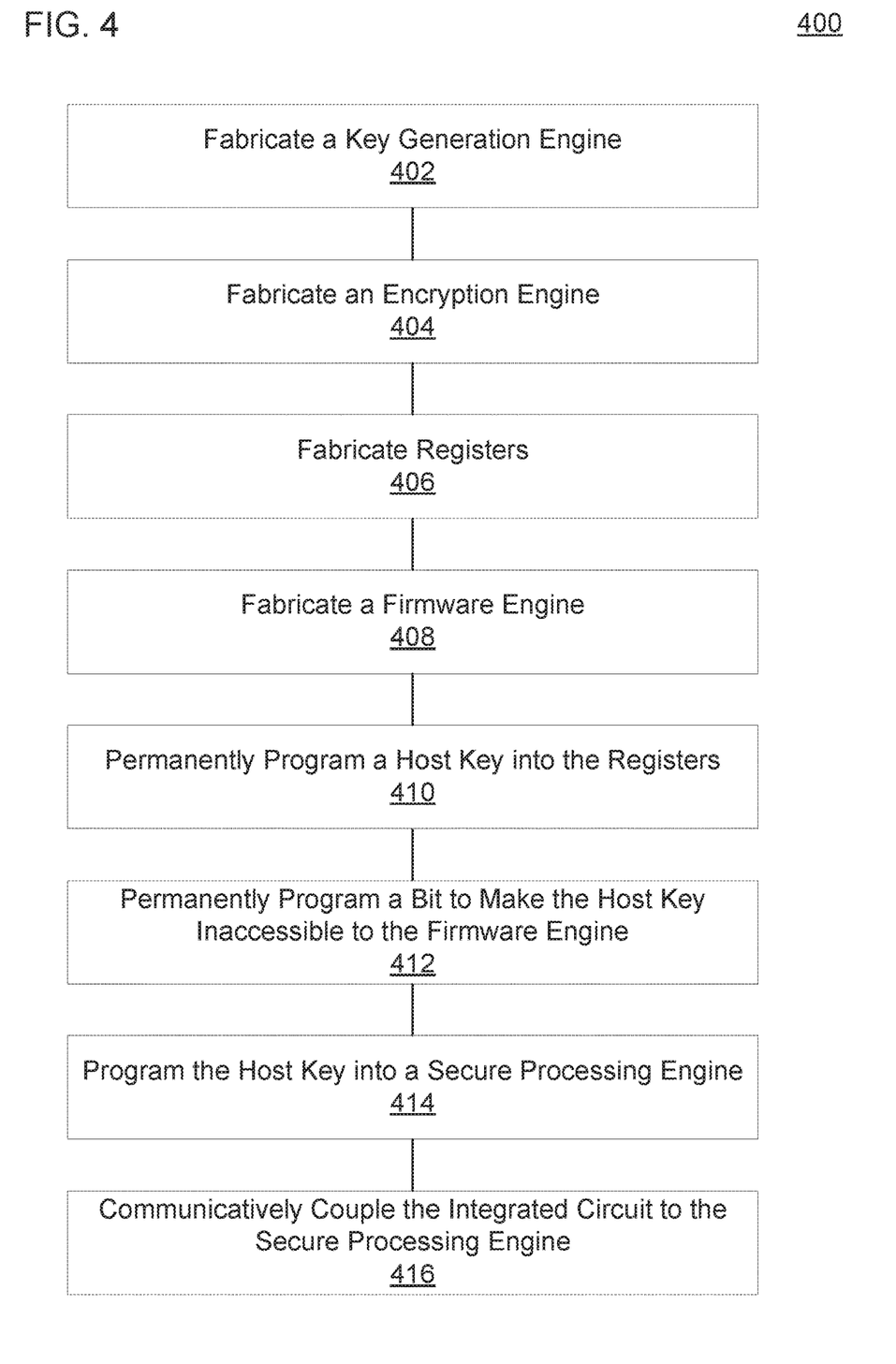
FIG. 4 is a flow diagram of another example method to produce a system able to communicate information between components securely.

FIG. 4 is a flow diagram of another example method 400 to produce a system able to communicate information between components securely. The method 400 may include fabricating a security engine. For example, at block 402, the method 400 may include fabricating a key generation engine to generate a session key. Fabricating the key generation engine may include manufacturing a circuit or storing instructions executable to generate a session key. The key generation engine may generate the session key based on a host key and a random or pseudorandom number exchanged with a secure processing engine.

Fabricating the security engine may also include, at block 404, fabricating an encryption engine to encrypt and decrypt communications based on the session key. The encryption engine may retrieve a plain text message and the session key and generate a cipher text message. The encryption engine may also retrieve a cipher text message and the session key and generate a plain text message. At block 406, the method 400 may include fabricating registers. Fabricating the registers may include fabricating OTP registers and rewritable registers. Fabricating the registers may include fabricating registers accessible by both a firmware engine and the security engine, fabricating registers accessible by only the security engine, fabricating a read access control register that is programmable and controls whether the firmware engine can access the registers, or the like.

At block 408, the method 400 may include fabricating the firmware engine. The firmware engine may execute firmware instructions received from a storage device storing the firmware instructions. Fabricating the security engine and the firmware engine may include fabricating a communicative coupling between the security engine and the firmware engine. In an example, the security engine and the firmware engine may be communicatively coupled by fabricating registers accessible to both the security engine and the firmware engine. The security engine, firmware engine, registers, etc. may be fabricated simultaneously as part of a single manufacturing process, may be fabricated sequentially, or the like. Fabricating the security engine, firmware engine, registers, etc. may include fabricating the security engine, firmware engine, registers, etc. as an integrated circuit on a microchip and packaging the microchip containing the integrated circuit into a single package.

At block 410, the method 400 may include permanently programming a host key into the registers. In an example, fabricating the registers may include fabricating an OTP register. Permanently programming the host key into the registers may include programming the host key into the OTP register, which may not be reprogrammable. Programming the OTP register may include blowing fuses or antifuses to connect the bits of the OTP register to voltage rails selectively and irreversibly. Programming the host key into the registers may occur before the package is connected to the rest of the system, after manufacturing of the system is otherwise complete, before or after testing of the system, or the like.

At block 412, the method 400 may include permanently programming a bit to make the host key inaccessible to the firmware engine. For example, the bit may be part of an OTP register that controls read access to other registers. Accordingly, permanently programming the bit may include programming the read access control OTP register. Each of a plurality of bits in the read access control OTP register may control whether a corresponding register is accessible to the firmware engine. The read access control OTP register may be programmed so a bit corresponding to the OTP register containing the host key is set to not allow access by the firmware engine to the OTP register. The OTP register containing the host key may still remain accessible to the security engine even if it is not accessible to the firmware engine.

At block 414, the method 400 may include programming the host key into a secure processing engine. For example, the secure processing engine may include a microcontroller, and the microcontroller may receive an instruction to store the host key in a secure location. In some examples, the secure processing engine may include an OTP memory that is programmed with the host key. At block 416, the method 400 may include communicatively coupling the integrated circuit to the secure processing engine. Communicatively coupling the integrated circuit to the secure processing engine may include wiring together communication interfaces of the integrated circuit and the processing engine, attaching the integrated circuit and the secure processing engine to a printed circuit board that connects the communication interfaces, or the like. Referring to FIG. 2, blocks 402-416 may be performed by a manufacturer to manufacture the system 200.

Figure 5:
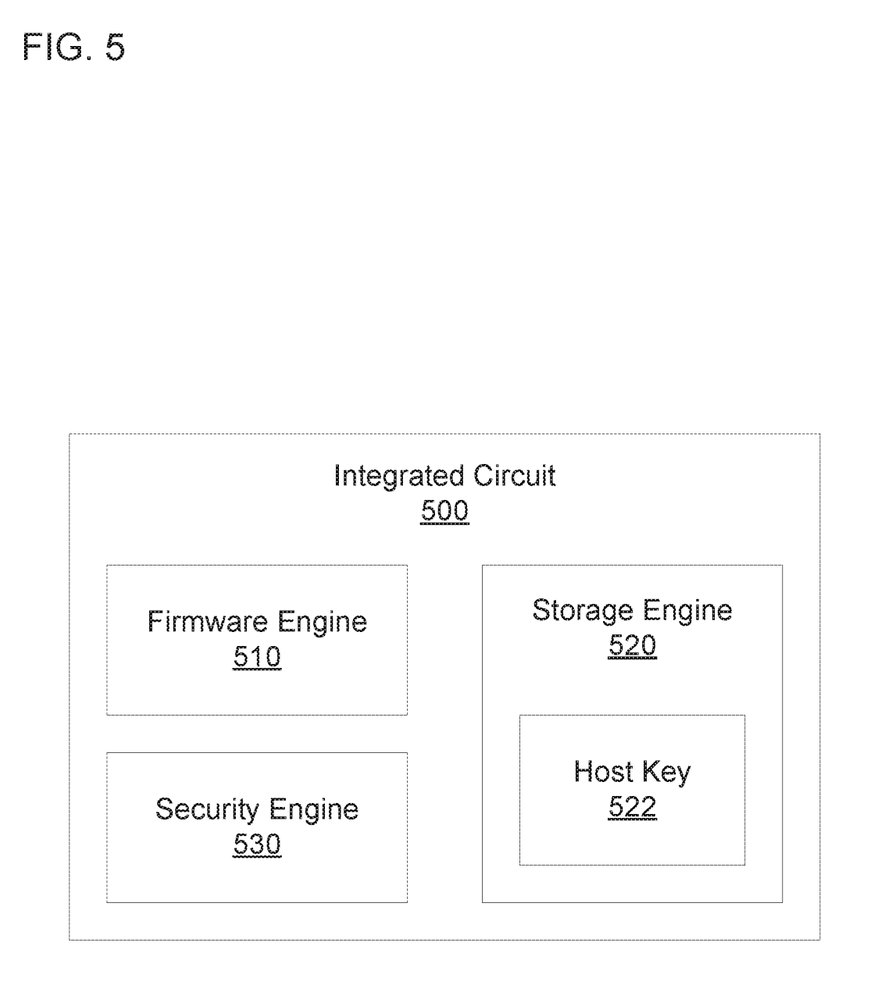
FIG. 5 is a block diagram of an example integrated circuit to communicate securely with remote devices.

FIG. 5 is a block diagram of an example integrated circuit 500 to communicate securely with remote devices. The integrated circuit 500 may include a firmware engine 510 to execute firmware instructions. The firmware instructions may be stored locally on the integrated circuit 500 or remotely from the integrated circuit 500. The integrated circuit 500 may also include a storage engine 520. The storage engine 520 may store a host key in a location inaccessible to the firmware engine 510. For example, the firmware engine 510 may read data from a location, perform operations on the data, and write the data to a location. However, the host key may be stored in a location that the firmware engine 510 is not allowed to read from or write to. Accordingly, the firmware engine 510 may not be able to learn the host key or to change the host key.

The integrated circuit 500 may include a security engine 530. The security engine 530 may be able to access the host key. The security engine 530 may generate a session key based on the host key and a random or pseudorandom number. The security engine 530 or the firmware engine 510 may communicate the random or pseudorandom number with a remote circuit. For example, the security engine 530 or the firmware engine 510 may transmit the random or pseudorandom number to the remote circuit or receive the random or pseudorandom number from the remote circuit. Accordingly, the remote circuit and the security engine 530 may generate the same session key based on the random or pseudorandom number and the independently stored host key without sharing the host key.

The security engine 530 may encrypt and decrypt communications based on the session key. For example, the security engine 530 may receive a plain text message for transmission to the remote circuit and encrypt the plain text message, or the security engine 530 may receive a cipher text message transmitted to the integrated circuit 500 and decrypt the cipher text message. The firmware engine 510 or the security engine 530 may communicate the communications with the remote circuit. For example, the firmware engine 510 or the security engine 530 may transmit communications that have been encrypted by the security engine 530 to the remote circuit. The firmware engine 510 or the security engine 530 may receive communications from the remote circuit and provide them to the security engine 530 for decryption.

Figure 6:
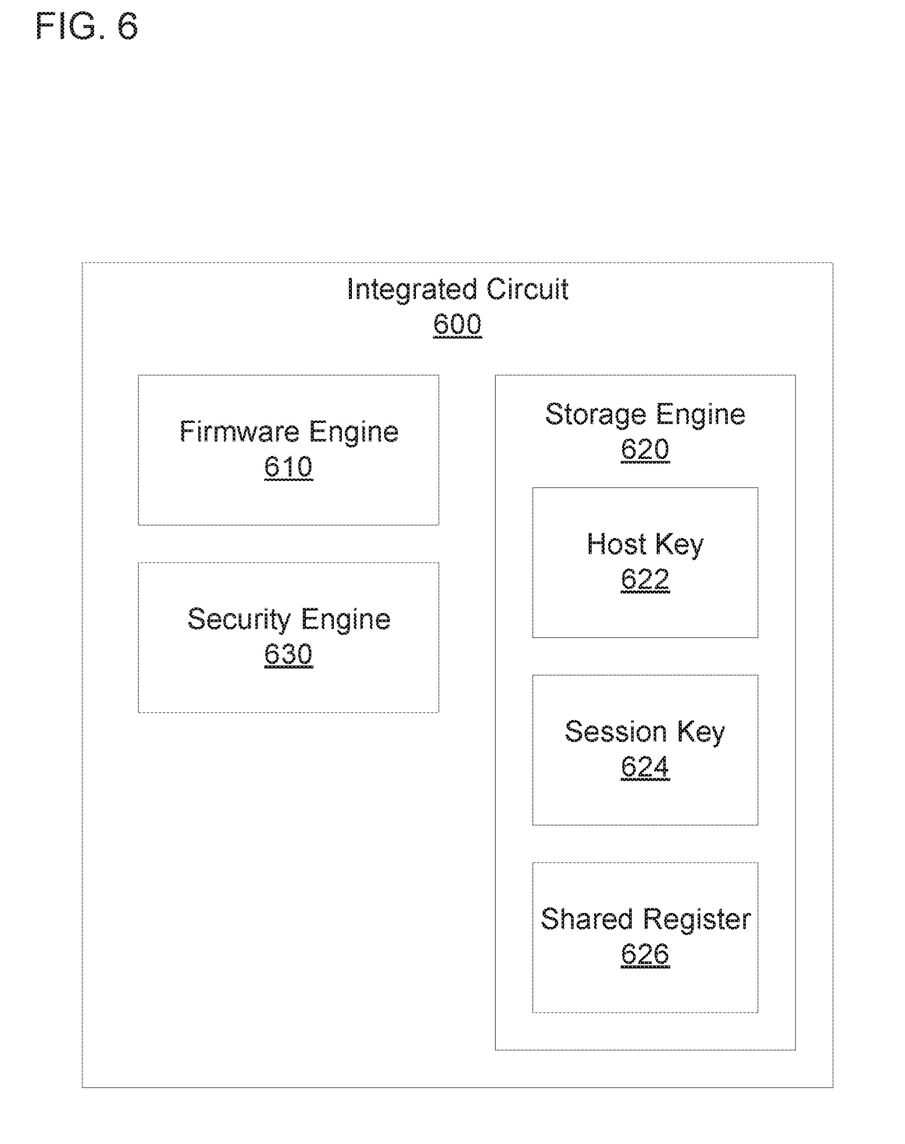
FIG. 6 is a block diagram of another example integrated circuit to communicate securely with remote devices.

FIG. 6 is a block diagram of another example integrated circuit 600 to communicate securely with remote devices. The integrated circuit 600 may include a firmware engine 610. The firmware engine 610 may execute firmware instructions. The integrated circuit 600 may also include a storage engine 620. In an example, the storage engine 620 may include a plurality of registers. For example, the storage engine 620 may include a register to store a host key 622. The register to store the host key 622 may be an OTP register. Accordingly, once the register is programmed with the host key 622, the contents cannot be modified to contain a different key. In addition, the register storing the host key 622 may be inaccessible to the firmware engine 610 or to any external attackers attempting to get access to the host key 622. The register may be programmed with the host key 622 before the ultimate product containing the integrated circuit is provided to a user.

The integrated circuit 600 may include a security engine 630. The security engine 630 may generate a session key 624 based on the host key 622. For example, the security engine 630 and a remote circuit, such as a secure microcontroller or the like, may know the host key 622. The security engine 630 or the firmware engine 610 may transmit a random or pseudorandom number to the remote circuit or receive the random or pseudorandom number from the remote circuit. The security engine 630 and the remote circuit may both generate the session key 624 based on the host key and the random or pseudorandom number. The security engine 630 and the remote circuit may hash the host key 622 and the random or pseudorandom number, concatenate them, xor them, or the like to generate the session key 624. The security engine 630 may store the session key 624 in a register that is rewriteable so a new session key can be generated for each session. The register that stores the session key 624 may be inaccessible to the firmware engine 610 or to external users in some examples.

The security engine 630 may encrypt and decrypt communications based on the session key 624. For example, the security engine 630 may use the session key 624 as a symmetric or asymmetric key for encrypting and decrypting communications. The remote circuit may also possess the session key and thus may also be able to encrypt and decrypt the communications. The firmware engine 610 or the security engine 630 may transmit the communications to and receive the communications from the remote circuit. In an example, the storage engine 620 may include a shared register 626. The shared register 626 may be accessible to the firmware engine 610 as well as the security engine 630. The firmware engine 610 may save plain text messages to be encrypted to the shared register, and the security engine 630 may encrypt the plain text messages stored in the shared register 626. In addition, the security engine 630 may decrypt cipher text messages received from the remote circuit and store the decrypted message in the shared register 626. The firmware engine 610 may read the decrypted message from the shared register 626. In some examples, the security engine 630 and the firmware engine 610 may transmit messages to be encrypted or that have been decrypted to each other without using the shared register 626.

In an example, the integrated circuit 600 may include a test mode. In the test mode, the contents of the storage engine 620 may be read out from the integrated circuit 600. In some examples, the host key 622 and session key 624 may not be read out during the test mode to prevent an attacker from learning of the host key 622 or the session key 624. For example, in the test mode, the storage engine 620 may output a subset of the contents stored in the storage engine 620, and the subset may not include the host key 622 and the session key 624. In some examples, the storage engine 620 may have multiple modes to allow access to the host key 622 and session key 624 during legitimate testing but prevent access once testing is complete. For example, the storage engine 620 may have a first mode in which the storage engine 620 will output the contents of the host key 622 and the session key 624 when the integrated circuit 600 is in a test mode. The storage engine 620 may be permanently transferable from the first mode to a second mode. For example, the storage engine 620 may receive an input, such as programming of an OTP bit, that permanently transitions the storage engine from the first mode to a second mode. In the second mode, the storage engine 620 may not output the host key 622 and the session key 624 when in test mode. Thus, functionality of the integrated circuit 600 can be tested completely during manufacture without allowing access to an attacker.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
a secure processing engine to store a host key in a one-time-programmable (OTP) memory; and
an integrated circuit in a single package, the integrated circuit including:
a firmware engine to execute firmware instructions, wherein the firmware engine is restricted from reading from the OTP memory; and
a security engine to:
encrypt, utilizing the host key from the OTP memory, communication provided to a first register by the firmware engine;
send the encrypted communication to the secure processing engine, wherein the secure processing engine decrypts the communication from the security engine using the host key from the OTP memory;
decrypt communication from a second register provided by the secure processing engine;
send the decrypted communication from the secure processing engine to the firmware engine; and
a storage engine to:
in a first mode, output the host key when the integrated circuit is in a test mode;
receive an input permanently transitioning the storage engine to a second mode; and in the second mode, not output the host key when the integrated circuit is in the test mode.

2. The system of claim 1, wherein the security engine is to generate a session key based on the host key, and encrypt and decrypt the communications based on the session key.

3. The system of claim 1, wherein the integrated circuit includes an OTP bit to isolate the OTP memory from the firmware engine.

4. The system of claim 1, wherein the security engine is to receive a message to be encrypted from the firmware engine and to store an encrypted version of the message in a memory location readable by the firmware engine.

5. The system of claim 1, wherein the integrated circuit is to enter the test mode, and wherein the OTP memory is unreadable externally in the test mode.

6. A method comprising:
permanently programming a host key into an integrated circuit in a single package, wherein the host key is inaccessible to a firmware engine in the integrated circuit;
in a first mode, outputting the host key when the integrated circuit is in a test mode;
receiving an input permanently transitioning a storage engine to a second mode;
in the second mode, not outputting the host key when the integrated circuit is in the test mode;
programming the host key into a secure processing engine; and
communicatively coupling the integrated circuit to the secure processing engine; and
communicatively coupling the firmware engine and a security engine, wherein the security engine is able to access the host key and the security engine is to:
encrypt, utilizing the host key from the single package, communication provided to a first register by the firmware engine;
send the encrypted communication to the secure processing engine, wherein the secure processing engine decrypts the communication from the security engine using the host key from the single package;
decrypt communication from a second register provided by the secure processing engine; and
send the decrypted communication from the secure processing engine to the firmware engine.

7. The method of claim 6, further comprising permanently programming a bit to make the host key inaccessible to the firmware engine.

8. The method of claim 6, comprising fabricating a key generation engine to generate a session key and fabricating an encryption engine to encrypt and decrypt communications based on the session key.

9. The method of claim 6, comprising fabricating registers accessible to the security engine and to the firmware engine.

10. An integrated circuit comprising:
a firmware engine to execute firmware instructions;
a storage engine to:
store a host key in a location inaccessible to the firmware engine;
in a first mode, output the host key when the integrated circuit is in a test mode;
receive an input permanently transitioning the storage engine to a second mode; and
in the second mode, not output the host key when the integrated circuit is in the test mode; and
a security engine to:
encrypt, utilizing the host key from the storage engine, communication provided to a first register by the firmware engine;
send the encrypted communication to a secure processing engine, wherein the secure processing engine decrypts the communication from the security engine using the host key from the storage engine;
decrypt communication from a second register provided by the secure processing engine; and
send the decrypted communication from the secure processing engine to the firmware engine.

11. The integrated circuit of claim 10, wherein at least one of the firmware engine and the security engine is to communicate a random or pseudorandom number with the secure processing engine by transmitting the random or pseudorandom number to the secure processing engine.

12. The integrated circuit of claim 10, wherein the storage engine is to store the host key in a location not read out when the integrated circuit is in the test mode.

* * * * *